US011002345B2

(12) United States Patent
Schorsch (10) Patent No.: US 11,002,345 B2
(45) Date of Patent: May 11, 2021

(54) COMPOUND PLANETARY FRICTION DRIVE (71) Applicant: IMSystems Holding B.V., Delft (NL)

(72) Inventor: Jack Floyd Schorsch, Delft (NL)

(73) Assignee: IMSystems Holding B.V., Delft (NL)

( * ) Notice: Subject to any disclaimer, the term of this patent is extended or adjusted under 35 U.S.C. 154(b) by 44 days.

(21) Appl. No.: 16/498,915

(22) PCT Filed: Mar. 31, 2018

(86) PCT No.: PCT/EP2018/058371
§ 371 (c)(1),
(2) Date: Sep. 27, 2019

(87) PCT Pub. No.: WO2018/178380
PCT Pub. Date: Oct. 4, 2018

(65) Prior Publication Data
US 2021/0088115 A1 Mar. 25, 2021

(30) Foreign Application Priority Data
Mar. 31, 2017 (EP) ..................................... 17164430

(51) Int. Cl.
F16H 13/06 (2006.01)
F16H 13/14 (2006.01)
(52) U.S. Cl.
CPC ............. F16H 13/06 (2013.01); F16H 13/14 (2013.01); F16H 2200/2007 (2013.01); F16H 2200/2097 (2013.01)
(58) Field of Classification Search
None
See application file for complete search history.

(56) References Cited

U.S. PATENT DOCUMENTS 3,216,285 A    11/1965  Nasvytis
5,459,925 A *  10/1995  Akeel ...................... B25J 9/102
                                                         29/893.2

(Continued)

FOREIGN PATENT DOCUMENTS

JP    S58-65361 A      4/1983
JP    2003-143805 A    5/2003

(Continued)

OTHER PUBLICATIONS

"Japanese Application Serial No. 2020-503359, Office Action dated Nov. 17, 2020", (w/ English Translation), 8 pgs.

Primary Examiner — Colby M Hansen
(74) Attorney, Agent, or Firm — Schwegman Lundberg & Woessner, P. A.

(57) ABSTRACT

It is described a compound planetary friction drive comprising a first sun wheel (2) and planetary wheels (3), wherein said first sun wheel (2) engages said planetary wheels (3), which planetary wheels (3) are arranged with two outer parts (3b) having a first radius (r1) and a central part (3a) having a second radius (r2), wherein the second radius (r2) differs from the first radius (r1) and transition regions (3c) are provided between the outer parts (3b) and the central part (3a), and wherein an outer ring annulus (1) and a central ring annulus (5) are provided that are in driving engagement with the planetary wheels (3), wherein the outer ring annulus (1) has two parts between which, along the length of the planetary wheels (3), the central ring annulus (5) is disposed, wherein the first sun wheel (2) is in frictional engagement with the outer parts (3b) of the planetary wheels (3), said outer parts (3b) of the planetary wheels (3) are in frictional engagement with the parts of the outer ring annulus (1) and the central ring annulus (5) is in frictional engagement with the central part (3a) of the planetary wheels (3), wherein the planetary wheels (3) are both hollow and compressible (Continued)

uninterruptedly along their entire length spanning the outer parts (3*b*), the transition regions (3*c*) and the central part (3*a*).

20 Claims, 4 Drawing Sheets

(56) References Cited

U.S. PATENT DOCUMENTS 7,105,964 B2    9/2006  Miyazaki et al.
2018/0163834 A1*  6/2018  Boguski ................ F16H 57/082

FOREIGN PATENT DOCUMENTS

WO    WO-2015/113163 A1    8/2015
WO    WO-2016/043579 A1    3/2016

* cited by examiner

COMPOUND PLANETARY FRICTION DRIVE

PRIORITY CLAIM TO RELATED APPLICATIONS

This application is a U.S. national stage filing under 35 U.S.C. § 371 from International Application No. PCT/EP2018/058371, filed on 31 Mar. 2018, and published as WO 2018/178380 A1 on 4 Oct. 2018, which claims the benefit under 35 U.S.C. 119 to European Patent Application No. 17164430.5, filed on 31 Mar. 2017, the benefit of priority of each of which is claimed herein, and which applications and publication are hereby incorporated herein by reference in their entirety.

The invention relates to a compound planetary friction drive comprising a first sun wheel and planetary wheels, wherein said first sun wheel engages said planetary wheels, which planetary wheels are arranged with parts having different radii, wherein transition regions are provided between the parts, and wherein ring annuli are provided that are driven by the planetary wheels, wherein one of the parts of the planetary wheels is in frictional engagement with the first sun wheel and in frictional engagement with a ring annulus and another one of the parts of the planetary wheels is in frictional engagement with another ring annulus, wherein the planetary wheels are both hollow and compressible uninterruptedly along their entire length spanning the parts of the planetary wheels and the transition regions.

JP S58-65361 A discloses a planetary friction drive with non-symmetrical planetary rollers that have a different radius and are connected to each other coaxially.

A non-symmetrical version of a compound planetary friction drive according to the preamble of claim 1 is known from U.S. Pat. No. 3,216,285 A. A compound planetary friction drive is well to be distinguished from a conventional compound planetary drive with discrete gear teeth. The invention is expressly restricted to compound planetary friction drives which do not have such discrete gear teeth.

There are difficulties within the design or implementation of the two cited compound planetary friction drives. Generally speaking, friction drives require a very high degree of precision to function efficiently, particularly when the drive is made from a material which is very rigid, such as steel. Due to steel having a high stress/strain relationship, a single ¹⁄₁₀₀₀th of a millimeter out of tolerance can result in a compressing force in the hundreds or thousands of Newton, which exceeds the failure limits of the material. Friction drives also have a minimum practical size, which is constrained on the one hand by the total amount of torque that needs to be carried as well as the materials used. This is because when two cylinders are placed in contact, the line where they touch each other is deformed. The maximum stress experienced by two cylinders in contact is inversely proportional to the diameter of the smallest cylinder, and with all other things being equal this incites the designer of a friction drive to apply larger diameter cylinders.

These difficulties were addressed in WO 2016/043 579 A1 by providing the first compound planetary friction drive.

However, also the compound planetary friction drive disclosed in WO 2016/043 579 A1 has a disadvantage in that the planet wheels tend to experience an axial twisting force when the friction drive is operated. Without means to prevent the twisting, the planet wheels will eventually move along their rotational axis until they eventually fall out of the housing of the drive. One of the solutions described in WO 2016/043 579 A1 is an addition of rollers. Another solution is to put loose fitting axes through the planets, connected to lids on both sides of the drive. All of this is not ideal, because the extra parts add extra complexity and reduce the efficiency of the drive.

It is therefore an object of the invention to provide a compound planetary friction drive where the internal forces are balanced out to prevent the twisting forces on the planet wheels, so fewer parts are needed and the efficiency increases.

This object is achieved by the compound planetary friction drive according to claim 1 in which each of the hollow planetary wheels, preferably at least three planetary wheels, are arranged with two outer parts having a first radius and a central part having a second radius, wherein the second radius differs from the first radius and the transition regions are provided between each of the outer parts and the central part, and wherein an outer ring annulus and a central ring annulus are provided that are in driving engagement with the planetary wheels, wherein the outer ring annulus has two parts between which, along the length of the planetary wheels, the central ring annulus is disposed, wherein the first sun wheel is in frictional engagement with the outer parts of the planetary wheels, said outer parts of the planetary wheels are in frictional engagement with the parts of the outer ring annulus and the central ring annulus is in frictional engagement with the central part of the planetary wheels. For example, the second radius may be larger than the first radius.

Due to the hollow planetary wheels having a hollow interior along their entire length, it is possible that the planetary wheels can compress along their entire body, like a hoop spring. Further, due to the construction of the planetary wheels with two outer parts, which have the same radius and between which a central part having a different radius is arranged, axial twisting forces that occur during operation with prior art planetary wheels having only two parts with different radii are balanced out. For example, the planetary wheels may in particular be configured symmetrically, i.e. with the two outer parts having the same length, However, it is also possible that they are not symmetrical, i.e. that the two outer parts have different lengths. In this context the word 'length' means the dimension of the planetary wheels in their longitudinal direction, or in other words along or parallel to their body axis. Thus, the length direction of the planetary wheels is the axial direction of the planetary wheels which is parallel to the rotational axis of the planetary wheels. A hollow interior means that the planetary wheel provides a hollow cavity which is inside the respective planetary wheel. An example is a tubular shape. Compressible means that the given shape of at least one planetary wheel may be deformed by an external force in the way that the volume of at least one planetary wheel decreases upon applying said external force. Preferably, the compound planetary friction drive according to the invention comprises at least three planetary wheels since this allows for a stable configuration of the different parts within the drive. For example, three planetary wheels might be arranged in a triangle-like arrangement if seen along a longitudinal direction of a planetary wheel. However, it may also be possible that the number of planetary wheels is two.

The compound planetary friction drive according to the invention may be operated in different ways of which one way is exemplarily described. When driving the first sun wheel, the rotational movement is transmitted to the planetary wheels due to their frictional engagement with the sun wheel. Furthermore, also the outer annulus will be driven due to the frictional engagement of the outer parts of the planetary wheels with the parts of the outer annulus. In addition, the central ring annulus is also driven due to engagement with the central part of the planetary wheels. Hence, via the frictional engagement of the different parts, the outer and central ring annuli are indirectly driven by the first sun wheel.

In any case, and independent of the way in which the drive is operated, during the friction based driving of the compound friction drive according to the invention, the axial twisting forces occurring during operation are balanced out due to the fact that the first sun wheel frictionally engages the planetary wheels on both sides of the central part of the planetary wheels. Hence, axial twisting of the planetary wheels is avoided and the planetary wheels do not move along their longitudinal axis. Moreover, fewer parts are used compared to WO 2016/043 579 A1, because no additional idler wheels and/or support elements are required, and the efficiency of the compound friction drive is increased.

In different embodiments of the invention one or both of the two parts of the outer annulus, the first sun wheel and the central annulus may have different functions. In general, one of the before mentioned parts may act as an input member, one of them may act as an output member and one of them may act as a ground for fixture. Therefore six different configurations are possible by changing the functions of the before mentioned parts. As a consequence of the varying function of each part, the gear ratio changes for each possible assignment of the mentioned functions to the various parts.

In a preferred embodiment of the invention, the central parts of the planetary wheels cooperate with a second sun wheel, preferably by frictional engagement. This configuration provides for an additional element which can be chosen to act as an input, as an output, as a ground fixture or as an idling part, i.e. a part which is moving upon operation of the drive but does not need to fulfill an additional function. Also one or both of the two parts of the outer annulus, the first sun wheel and the central annulus can now act as an idling element, thereby extending the number of configurations in which the drive can be operated to twenty-four different options. Furthermore, the second sun wheel may further prevent bending of the planetary wheels by providing pressure to the central parts of the planetary wheels that balances with the pressure caused by the central annulus. Another effect of this pressure is the improved frictional engagement, resulting in the allowance of a higher torque to be transferred. The second sun wheel is preferably hollow. However, depending on the configuration, the second sun wheel may also be solid.

In an embodiment of the invention, from this point forward referred to as a 'typical configuration', which is a preferred exemplary configuration or embodiment, the first sun wheel acts as the input, the second sun wheel acts as the idling element, the parts of the outer annulus act as the ground fixture and the central annulus acts as the output.

In an embodiment of the invention, outer idling wheels are disposed between the outer parts of the planetary wheels and the parts of the outer ring annulus, and central idling wheels are disposed between the central part of the planetary wheels and the central ring annulus. Disposing the outer idling wheels between the outer parts of the planetary wheels and the parts of the outer ring annulus may serve to provide for an even more balanced distribution of forces to the planetary wheels, thereby improving balancing out of axial twisting forces, while still ensuring transfer of rotation from the first sun wheel to the outer parts of the planetary wheels via frictional engagement. However, the number of parts of the drive is increased.

In this embodiment it is preferred that the outer idling wheels and the central idling wheels are axially aligned. This arrangement allows for a simple construction while keeping the advantage of balancing the forces thereby avoiding axial twisting. For example, the outer idling wheels and the central idling wheels may be preferably mounted on a carrier structure which allows the outer and central idling wheels to rotate freely, but remain in axial alignment.

In an embodiment of the invention, the parts of the outer annulus are connected by an arm or portion extending or going around the central annulus. By this configuration, the parts of the outer annulus are coupled and may not rotate independently. However, in any case, the parts of the outer annulus may rotate with respect to the central annulus. Hence, the connected parts of the outer annulus may serve, e.g., as an input member and the central annulus may serve as an output member or vice versa. Furthermore, other configurations may be possible involving the connected two parts of the outer annulus as either an input member or an output member or as a ground fixture or as an idling member. When common rotation of the parts of the outer annulus is required and a small volume is no design driver, this option is the simplest one for back-and-forth rotating applications. However, for most continuously rotating applications this embodiment provides no solution, due to the limited operational angle resulting from the arm or portion extending around the central annulus that possibly interferes with a ground fixture or output connected to the central annulus.

In an embodiment of the invention, the compound planetary friction drive comprises a motor or generator and the first sun wheel is hollow to leave enough space for the motor or generator that is placed inside the hollow interior of the first sun wheel and that is connected, preferably directly, to the first sun wheel and that is also connected, e.g. via a frame or one or more other intermediate interconnection members, to one or both parts of the outer annulus. For example, an output or input shaft of the motor or generator may be coupled with the first sun wheel and a housing of the motor or generator may be connected to one or both of the parts of the outer annulus, or vice versa. Using this configuration, the motor or generator may drive a relative rotation between the first sun wheel and the parts of the outer annulus. The advantage of this configuration is that said relative rotation is impelled without or with lower unwanted friction losses caused by an indirect transmission of the motor or generator force or torque to or from the first sun wheel. This improves the efficiency of the compound planetary friction drive. Furthermore, this connection allows to prevent the parts of the outer annulus to independently rotate without connecting them via an arm or portion extending around the central annulus, as described in the embodiment of the previous paragraph. This allows for applications that require continuous rotation.

In an embodiment of the invention, the compound planetary friction drive comprises a motor or generator and the first sun wheel is hollow to leave enough space for the motor or generator that is placed inside of the hollow interior of the first sun wheel and that is connected, preferably directly, to the first sun wheel and that is also connected, e.g. via a frame or one or more other intermediate interconnection members, to the central annulus. For example, an output or input shaft of the motor or generator may be coupled with the first sun wheel and a housing of the motor or generator may be connected to the central annulus, or vice versa. Using this configuration, the motor or generator may drive a relative rotation between the first sun wheel and the central annulus. The advantage of this configuration is that said relative rotation is impelled without or with lower unwanted friction losses caused by an indirect transmission of the motor or generator force to or from the first sun wheel and the central annulus. This improves the efficiency of the compound planetary friction drive. However, the connection between the motor or generator and the central annulus can only be made via one or two arms or portions extending around one or both parts of the outer annulus. When the parts of the outer annulus are connected, either via a connection through the drive center or around the central annulus, there will be a limited operational angle where the connection between the parts of the outer annulus will not interfere with the connection between the motor or generator and the central annulus. This limits this embodiment to back-and-forth rotating applications.

In an embodiment of the invention, the first sun wheel consists of two separate parts that are physically connected or become physically connected during assembly. As a result, the first and the second part of the first sun wheel may only perform a common rotation. This configuration has the advantage that it is simple to arrange a hollow second sun wheel around the first sun wheel. This facilitates both the setup and the manufacturing of the compound planetary friction drive.

In an embodiment of the invention, the first sun wheel is split in two separate parts that are not connected. Furthermore, the two separate parts do not extend to the central part. Without a mechanical connection between the first and the second part of the first sun wheel, both parts may rotate independently from each other. As a consequence, this configuration resembles a differential gear set. This configuration is beneficial for the assembly process and is the preferred option in case the first sun wheels act as the idling element, since common rotation is of minor importance when the first sun wheel is idling. Another advantage is that the second sun wheel can now be reached from the inside if one or both of the parts of the first sun wheel are hollow. As a result the second sun wheel can now function as input, as output or as the ground fixture, besides functioning as the idling element, which is the only possible function when it cannot connect to parts outside of the drive.

In an embodiment of the invention that corresponds to the embodiment described in the previous paragraph the two separate parts of the first sun wheel leave enough space in between to fit or arrange a hollow second sun wheel between the two parts, which hollow second sun wheel leaves enough space to place a motor or generator inside the second sun wheel, wherein the motor or generator is connected, preferably directly, to the second sun wheel and which is also connected, e.g. via a frame or one or more other intermediate interconnection members, to one or both parts of the first sun wheel. For example, an output or input shaft of the motor or generator may be coupled with the second sun wheel and a housing of the motor or generator may be connected to one or both parts of the first sun wheel, or vice versa. Using this configuration, the motor or generator may drive a relative rotation between the first or second part of the first sun wheel or both parts, if physically connected, and the second sun wheel. The advantage of this configuration is that said relative rotation is impelled without or with lower unwanted friction losses caused by an indirect transmission of the motor or generator force to or from the first sun wheel and the parts of the outer annulus. This improves the efficiency of the compound planetary friction drive. Another advantage of a configuration in which the motor or generator is connected to both parts of the first sun wheel is that a connection forcing common rotation, which is desirable for certain applications, is made on the inside of the drive. As a result no connection on the outside, extending over the central annulus, is required, resulting in a smaller volume and the possibility of no restrictions as to the maximum operational angle.

For this embodiment it is optional to make the two parts of the first sun wheel solid. This facilitates both the setup and the manufacturing of the compound planetary friction drive. However, in case of two solid parts of the first sun wheel, the motor or generator cannot be connected to an electricity source or sink outside of the drive via a cable, at least not in a simple manner. An option is to use a battery on the inside. Another option is to make the two parts of the first sun wheel out of conductive materials and connect one part to a positive electric pole and the other part to a negative electric pole. This makes it possible to make the motor or generator work without using a battery by connecting the cabling of the motor or generator to the corresponding parts of the first sun wheel.

In an embodiment of the invention, in which the first sun wheel is split in two separate parts that are not connected, as described above, the compound planetary friction drive comprises a motor or generator and the two separate parts of the first sun wheel are hollow and leave enough space in between to fit or arrange a hollow second sun wheel between them that leaves enough space to place a motor or generator inside the second sun wheel, wherein the motor or generator is connected, preferably directly, to the second sun wheel and which is also connected, e.g. via a frame or one or more other intermediate interconnection members, to one or both parts of the outer annulus. For example, an output or input shaft of the motor or generator may be coupled with the second sun wheel and a housing of the motor or generator may be connected to one or both parts of the outer annulus, or vice versa. Using this configuration, the motor or generator may drive a relative rotation between one or both parts of the outer annulus and the second sun wheel. The advantage of this configuration is that said relative rotation is impelled without or with lower unwanted friction losses caused by an indirect transmission of the motor or generator force to or from the second sun wheel and the parts of the outer annulus. In general, when all parts function as in the typical configuration, except for the first sun wheel, now acting as the idling element and the second sun wheel, now acting as the input, the drive is able to achieve a higher gear ratio than when using the functions of a typical configuration, while keeping the diameters of all parts that are in frictional engagement the same. This embodiment is especially suitable for this high gear ratio configuration.

In an embodiment of the invention, in which the first sun wheel is split in two separate parts that are not connected, as described above, the compound planetary friction drive comprises a motor or generator and the two separate parts of the first sun wheel are hollow and leave enough space in between to fit or arrange a hollow second sun wheel between them that leaves enough space to place a motor or generator inside the second sun wheel, wherein the motor or generator is connected, preferably directly, to the second sun wheel and which is also connected, e.g. via a frame or one or more other intermediate interconnection members, to the central annulus. For example, an output or input shaft of the motor or generator may be coupled with the second sun wheel and a housing of the motor or generator may be connected to the central annulus, or vice versa. In this embodiment the central annulus will most likely function as the ground fixture, meaning the second sun wheel will act as the input. Complex constructions are required to make the connections between the parts of the outer annulus and possibly the parts of the first sun wheel such that they do not interfere with each other or the connection between the motor or generator and the central annulus. As a consequence no application is found yet where this embodiment is favorable.

For each embodiment of the invention where a motor or generator is placed inside a hollow second sun wheel and is directly connected to the second sun wheel and which is also connected, e.g. via a frame or one or more other intermediate interconnection members, to either one or both parts of the first sun wheel, one or both parts of the outer annulus or the central annulus, it is possible to remove the second sun wheel and have the motor or generator itself act as the second sun wheel, i.e. the outside of a housing of the motor or generator is in frictional engagement with the central part of the planetary wheels, and the motor or generator and in particular an output or input shaft thereof is also connected, e.g. via a frame or one or more other intermediate interconnecting members, to either one or both parts of the first sun wheel, one or both parts of the outer annulus or the central annulus. This configuration has the advantage that, e.g., a motor or generator may easily be placed between the two parts of the first sun wheel. In the case where the motor or generator connects to the second sun wheel and one or both parts of the first sun wheel, the parts of the first sun wheel do not have to be hollow in order to place a motor or generator inside. This facilitates both the setup and the manufacturing of the compound planetary friction drive.

In an embodiment of the invention in which the first sun wheel is split into two parts as described above, the compound planetary friction drive is characterized in that the two separate parts of the first sun wheel do not extend to the central part and that the second sun wheel is solid.

In an embodiment of the invention, the compound planetary friction drive is characterized in that the second sun wheel is removed and that the outside of the motor or generator acts as the second sun wheel, meaning the outside of the motor or generator will be in direct frictional engagement with the central parts of the planetary wheels.

Although the goal of the invention is to reduce the amount of needed parts it is possible to create an embodiment of the invention comprising outer idling wheels and central idling wheels as explained in WO 2016/043 579 A1. This prevents advancing or retreating of a planetary wheel with respect to the other planetary wheels.

The invention will hereinafter be further elucidated with reference to drawings of exemplary embodiments of a compound planetary friction drive according to the invention that is not limiting the scope of the invention, wherein.

Whenever in the figures the same reference numerals are used, these numerals refer to the same parts.

Figure 1:
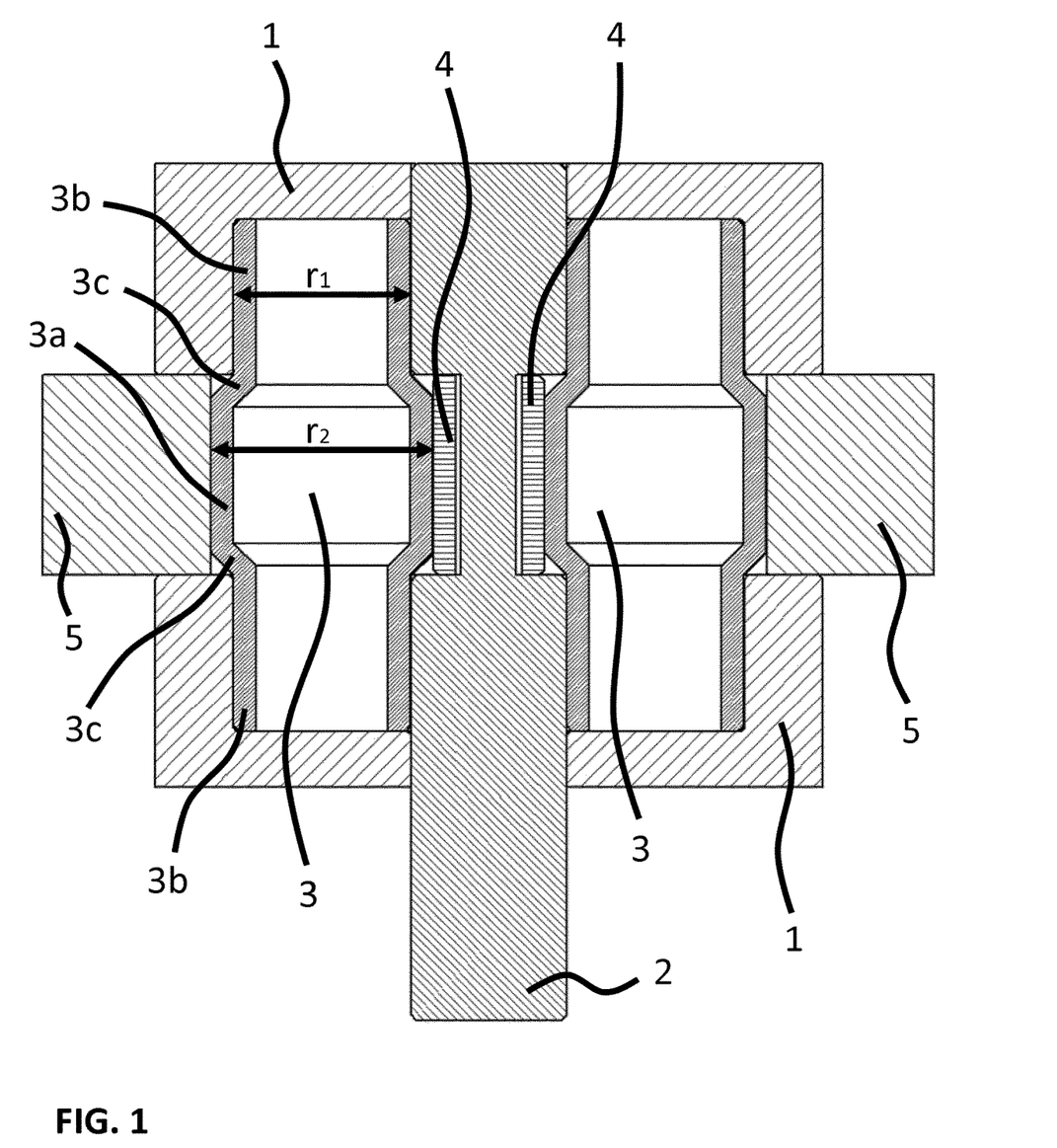
FIG. 1 shows in a cross-sectional side view a first embodiment of an apparatus according to the invention.

FIG. 1 shows a basic embodiment of the invention in a cross-sectional view. In detail, FIG. 1 shows two parts of an outer ring annulus 1 in which a first sun wheel 2, two hollow planetary wheels 3, an idling hollow second sun wheel 4 and a central ring annulus 5 are arranged. Any connections to the surroundings are omitted in this schematic figure for reasons of clarity. In practice, there are numerous ways to connect the compound planetary friction drive according to the invention to an external surrounding.

The two planetary wheels 3 comprise a central part 3a and two outer parts 3b on both sides of the central part 3a along the longitudinal axis of the planetary wheels. The outer parts 3b have a first radius $r_1$, seen perpendicular to the longitudinal axis of the respective planetary wheel. The central part 3a has a second radius $r_2$ which is different to the first radius $r_1$ and, in the example shown, preferably larger. The central part 3a is connected to the outer parts 3b via a respective transition region 3c. Furthermore, the first sun wheel 2 is in frictional engagement with the outer parts 3b of the planetary wheels 3. In addition, the two parts of the outer ring annulus 1 and the central ring annulus 5 are configured to be in driving engagement with the two planetary wheels 3. In detail, the outer parts 3b of each planetary wheel 3 are in frictional engagement with the two parts of the outer ring annulus 1. The central ring annulus 5 is in frictional engagement with the central part 3a of each planetary wheel 3. Each planetary wheel 3 is hollow and compressible uninterruptedly along its entire length spanning its outer parts 3b, its transition regions 3c and its central part 3a.

Furthermore, the central part 3a of each planetary wheel 3 cooperates with the idling hollow second sun wheel 4, e.g. by frictional engagement. The idling hollow second sun wheel 4 is coaxially aligned to the first sun wheel 2 and is arranged in a circumferential recess provided in the circumferential surface of the first sun wheel 2. The recess has a smaller radius than the adjacent portions of the first sun wheel 2, so that it fits the radius of the hollow second sun wheel 4. Furthermore, the central part 3a of each planetary wheel 3 has a larger radius r2 than the outer parts 3b so that it fits the dimensions of the recess of the first sun wheel 2 and is partially located within the recess. In case no idling hollow second sun wheel 4 was used, the central parts 3a of the planetary wheels 3 would not be in contact with the first sun wheel 2.

It is also possible that the compound planetary friction drive in FIG. 1 comprises outer idling wheels that are disposed between the respective outer part 3b of each planetary wheel 3 and the two parts of the outer ring annulus 1. Furthermore, a central idling wheel may be disposed between the central part 3a of the planetary wheels 3 and the central ring annulus 5. In this case, both the outer idling wheels and the central idling wheel are axially aligned. It may also be possible that the outer idling wheels and the central idling wheel are mounted on a carrier structure which allows the outer and the central idling wheels to freely rotate.

Figure 2:
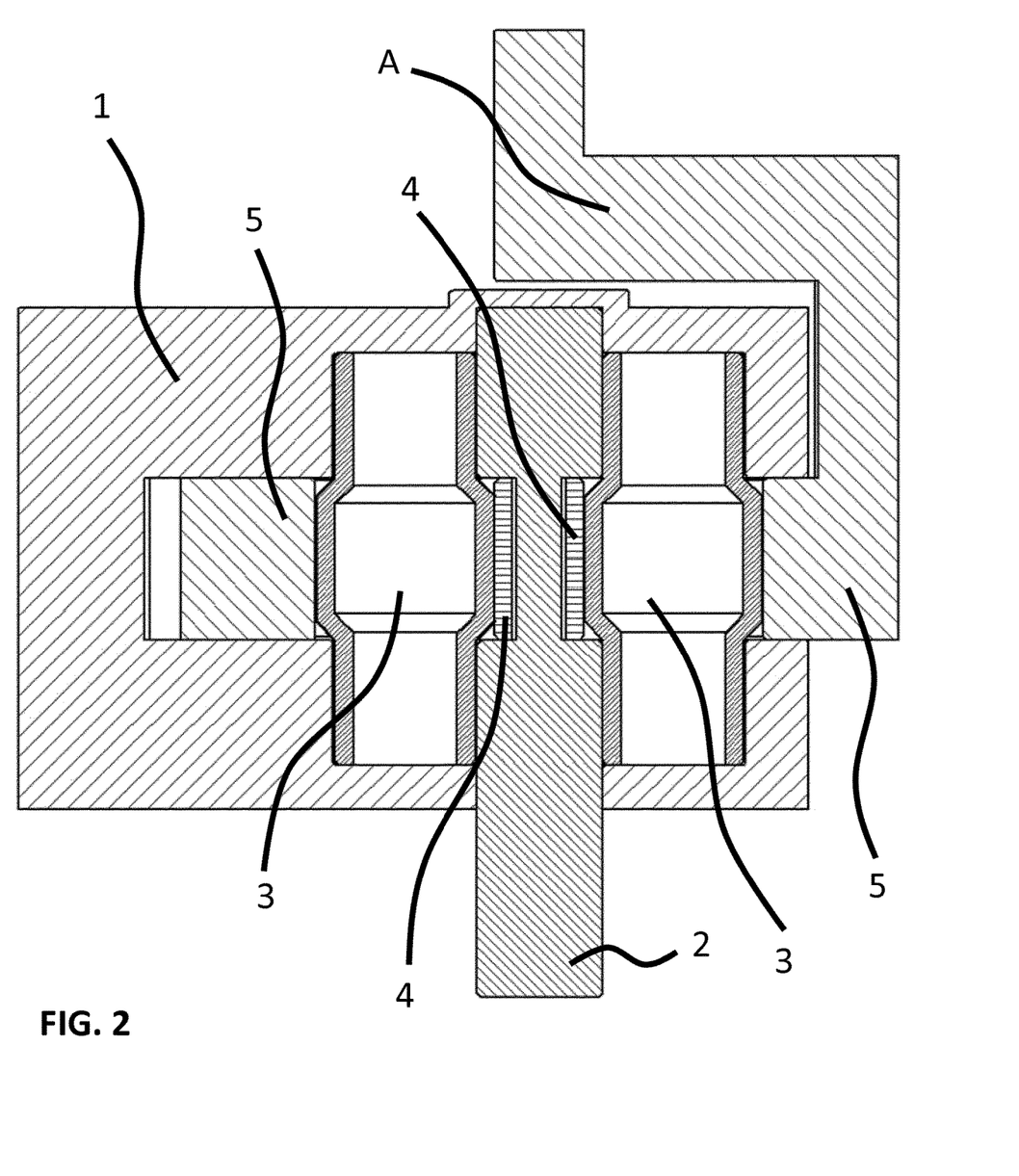
FIG. 2 shows in a cross-sectional side view a configuration of the apparatus, connecting the two parts of the outer annulus and providing the central annulus with an output shaft co-axial to the input shaft.
Figure 3:
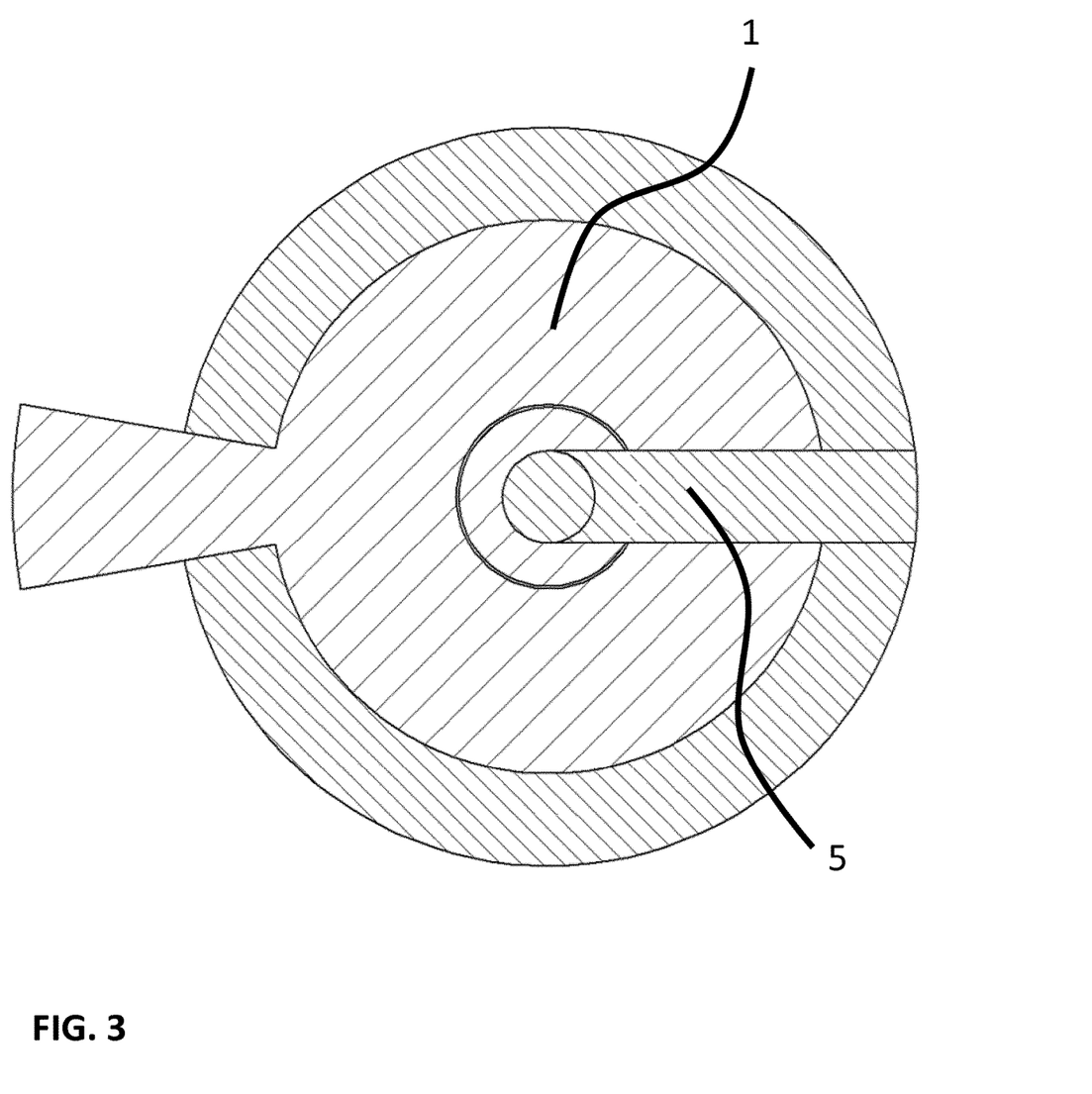
FIG. 3 shows a top down view of the apparatus according to FIG. 2.

The constituents or components of the drive illustrated in FIG. 1, i.e. one or both of the two parts of the outer annulus 1, the first sun wheel 2, the second sun wheel 4 or the central annulus 5 may have different functions, as already explained generally above. In general, one of the before mentioned parts may act as an input member, one of them may act as an output member, one of them may act as a ground for fixture and one of them may be idling. In particular, this means that the second sun wheel 4 does not have to be idle for every configuration. As a consequence of the varying function of each part, the gear ratio changes for each change of the distribution of the before mentioned functions of each respective part. A typical configuration is a configuration where the first sun wheel 2 acts as the input member, the second sun wheel 4 act as the idling part, the two parts of the outer annulus 1 act as the ground for fixture and the central ring annulus 5 acts as the output, as already defined above. It may also be useful to connect the parts of the outer annulus 1 to each other when acting as a ground for fixture. The latter is shown in FIGS. 2 and 3. FIG. 2 shows a side view of a similar embodiment compared to the one in FIG. 1. FIG. 3 shows the same embodiment of FIG. 2 in a top view. In FIG. 2, the two parts of the outer annulus 1 of FIG. 1 are now connected to each other. Furthermore, the central annulus 5 comprises an arm A with an output shaft built on it. However, in this configuration a full output rotation is not possible anymore.

It should be noted that if the outer annulus 1 is used as idling member, the two parts of the outer annulus 1 do not need to be connected.

Figure 4:
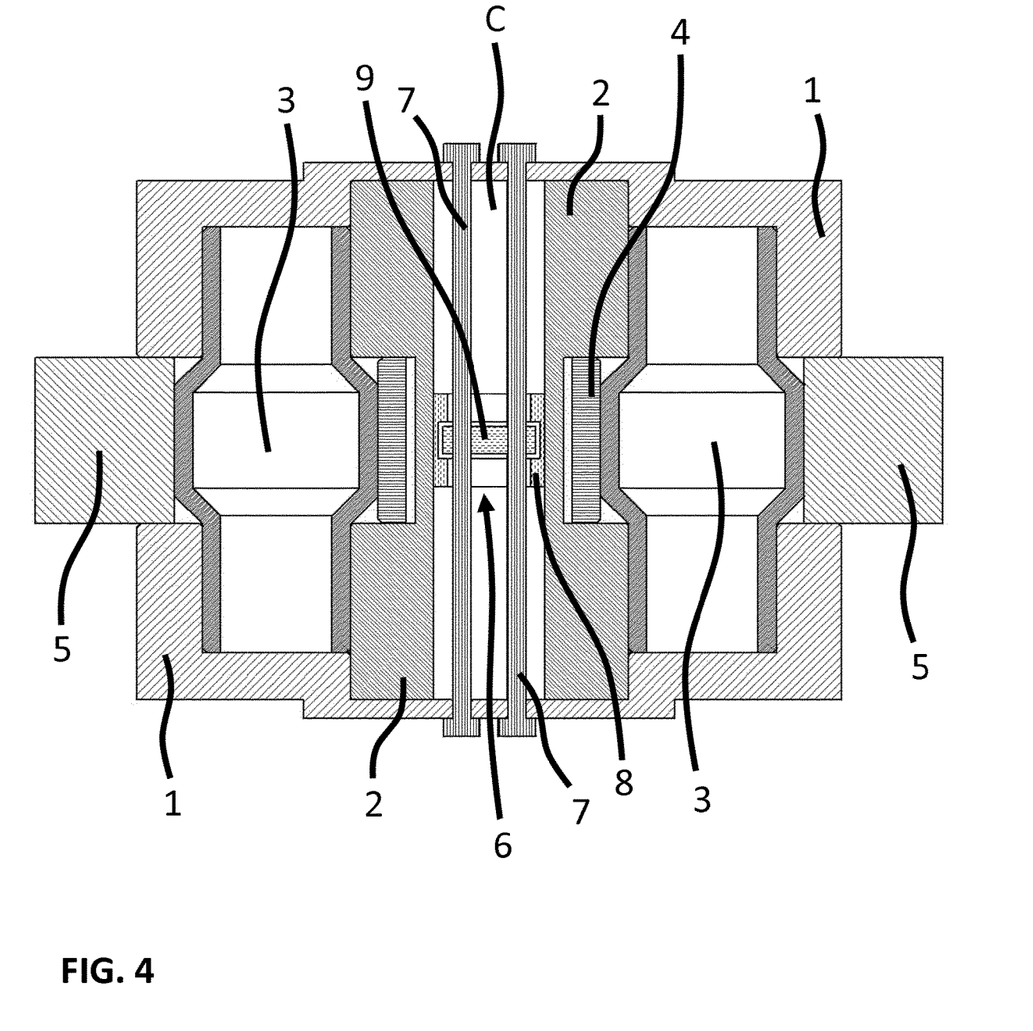
FIG. 4 shows in a cross-sectional side view a configuration of the invention containing the input motor inside the apparatus.

FIG. 4 shows very schematically another embodiment of the compound planetary friction drive according to the invention in which the first sun wheel 2 is hollow thereby providing a cavity C in which a motor 6 is placed. An output shaft 8 of the motor 6 is directly connected to the first sun wheel 2 which is thereby acting as an input member. Furthermore, a housing 9 of the motor 6 is connected via a frame, e.g. realized by bolts 7, to the outer annulus 1 which acts as a ground. However, it is also possible that the housing 9 of the motor 6 is connected to the central annulus 5 instead of the outer annulus 1. It is also possible that the output shaft 8 of the motor 6 is connected to either the central annulus 5 or the outer annulus 1 which are thereby acting as an input member. In that case, the housing 9 of the motor 6 may be connected to the first sun wheel 2 which then acts as a ground. It is also possible that the housing 9 of the motor 6 is coupled to the planetary wheels 2 and the output shaft 8 is coupled to the outer annulus 1 via the bolts 7. However, the opposite situation may also be possible. Due to the cavity C provided within the first sun wheel 2, it is possible to fix the motor 6, e.g. the housing 9 thereof, to the parts of the outer annulus 1 thereby acting as a ground for fixture via the bolts 7. Similar to the embodiment in FIG. 1, many configurations may be realized having the motor 6 arranged within the first sun wheel 2, wherein the configuration strongly depends on the part the output shaft 8 and the housing 9 of the motor 6 are connected to.

Furthermore, the first sun wheel 2 may comprise a first and a second part. These two parts may either be physically, i.e. mechanically, connected or may not be connected. If the first and the second part of the first sun wheel 2 are not connected to each other, both first and second part of the first sun wheel 2 may provide a cavity C which is arranged between them. Furthermore, a motor 6 is placed in said cavity. The motor 6—e.g. a housing or an output shaft thereof—may be directly connected to the second sun wheel 4 and—e.g. an output shaft or a housing of the motor—via a frame to either one of the two parts or to both of the two parts of the first sun wheel 2. As an alternative, the motor 6—e.g. a housing or an output shaft thereof—may also be connected to the second sun wheel 4 and—e.g. an output shaft or a housing of the motor—via a frame to the at least one outer annulus 1, which may serve as output annulus. As a third alternative, motor 6—e.g. a housing or an output shaft thereof—maybe directly connected to the second sun wheel 4 and—e.g. an output shaft or a housing of the motor—via a frame to the central annulus 5. The first and second part of the first sun wheel 2 may also be spaced from each other within the plane of the annulus 5 and the second sun wheel 4 may be solid.

In case the first sun wheel 2 comprises only a single part, the fabrication of the second sun wheel 4 may in practice be realized—preferably together with the first sun wheel 2—by additive manufacturing techniques such as 3D printing or laser sintering. Without making use of 3D printing it will not be possible to manufacture the first sun wheel 2 with idling sun wheel 4 around his center. There are multiple options to deal with this that include, but are not limited to:

- Make one first sun wheel that goes from the bottom to the top of the friction drive, wherein "top" relates to the upper part of the embodiment of the invention in FIG. 4, and "bottom" relates to the lower part of FIG. 4. Only at the bottom it has the large radius, and in the central and top part it has the small radius required to go through the second sun wheel 4. A second sun wheel with the large radius is put at the top with the first sun wheel going through it. Both can be extended such that they are longer than the planet wheel at the top, to create space to couple them with, e.g., bolts.
- Another option is to make one solid sun wheel that fits the bottom and central part and another one that fits the top part. Then bolts extend all the way through both of them to connect them.
- A third option is to make two solid sun wheels that only fit the bottom and top part. In this case one will follow the other and act the same. A disadvantage is that the internal forces are less balanced. For this configuration the idling sun wheel 4 can be made solid as well.

Although the invention has been discussed in the foregoing with reference to an exemplary embodiment of the compound planetary friction drive of the invention, the invention is not restricted to this particular embodiment which can be varied in many ways without departing from the gist of the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a ambiguity in the wording of the claims shall be resolved using this exemplary embodiment.

The invention claimed is:

1. Compound planetary friction drive comprising a first sun wheel and planetary wheels, wherein said first sun wheel engages said planetary wheels, which planetary wheels are arranged with two outer parts having a first radius ($r_1$) and a central part having a second radius ($r_2$), wherein the second radius ($r_2$) differs from the first radius ($r_1$) and transition regions are provided between the outer parts and the central part, and wherein an outer ring annulus and a central ring annulus are provided that are in driving engagement with the planetary wheels, wherein the outer ring annulus has two parts between which, along the length of the planetary wheels, the central ring annulus is disposed, wherein the first sun wheel is in frictional engagement with the outer parts of the planetary wheels, said outer parts of the planetary wheels are in frictional engagement with the parts of the outer ring annulus and the central ring annulus is in frictional engagement with the central part of the planetary wheels, wherein the planetary wheels are both hollow and compressible uninterruptedly along their entire length spanning the outer parts, the transition regions and the central part.

2. Compound planetary friction drive according to claim 1, characterized in that the central parts of the planetary wheels cooperate with an idling hollow second sun wheel.

3. Compound planetary friction drive according to claim 2, characterized in that outer idling wheels are disposed between the outer parts of the planetary wheels and the two parts of the outer ring annulus, and central idling wheels are disposed between the central part of the planetary wheels and the central ring annulus.

4. Compound planetary friction drive according to claim 3, characterized in that the outer idling wheels and the central idling wheels are axially aligned.

5. Compound planetary friction drive according to claim 4, characterized in that the outer idling wheels and the central idling wheels are mounted on a carrier structure which allows the outer and central idling wheels to rotate freely, but remain in axial alignment.

6. Compound planetary friction drive according to claim 3, characterized in that the outer idling wheels and the central idling wheels are mounted on a carrier structure which allows the outer and central idling wheels to rotate freely, but remain in axial alignment.

7. Compound planetary friction drive according to claim 3, characterized in that the parts of the outer annulus are connected by an arm going around the central annulus.

8. Compound planetary friction drive according to claim 1, characterized in that outer idling wheels are disposed between the outer parts of the planetary wheels and the two parts of the outer ring annulus, and central idling wheels are disposed between the central part of the planetary wheels and the central ring annulus.

9. Compound planetary friction drive according to claim 8, characterized in that the outer idling wheels and the central idling wheels are axially aligned.

10. Compound planetary friction drive according to claim 8, characterized in that the outer idling wheels and the central idling wheels are mounted on a carrier structure which allows the outer and central idling wheels to rotate freely, but remain in axial alignment.

11. Compound planetary friction drive according to claim 1, characterized in that the parts of the outer annulus are connected by an arm going around the central annulus.

12. Compound planetary friction drive according to claim 1, characterized in that the compound planetary friction drive further comprises a motor or generator and the first sun wheel is hollow to leave enough space for the motor or generator which is placed inside of it, wherein the motor or generator is connected to the first sun wheel and to one or both parts of the outer annulus.

13. Compound planetary friction drive according to claim 1, characterized in that the compound planetary friction drive further comprises a motor or generator and the first sun wheel is hollow to leave enough space for the motor or generator which is placed inside of it, wherein the motor or generator is connected to the first sun wheel and to the central annulus.

14. Compound planetary friction drive according to claim 1, characterized in that the first sun wheel consists of two separate parts that are physically connected.

15. Compound planetary friction drive according to claim 14, characterized in that the compound planetary friction drive further comprises a motor or generator and the two separate parts of the first sun wheel leave enough space in between to place the motor or generator which is connected to the second sun wheel and to one or two of the parts of the first sun wheel.

16. Compound planetary friction drive according to claim 15, characterized in that the second sun wheel is removed and that the outside of the motor or generator acts as the second sun wheel, meaning the outside of the motor or generator will be in direct frictional engagement with the central parts of the planetary wheels.

17. Compound planetary friction drive according to claim 1, characterized in that the first sun wheel is split in two separate parts that are not connected.

18. Compound planetary friction drive according to claim 17, characterized in that the compound planetary friction drive further comprises a motor or generator and the two separate parts of the first sun wheel are hollow and leave enough space in between to place the motor or generator which is connected to the second sun wheel and to one or both parts of the outer annulus.

19. Compound planetary friction drive according to claim 17, characterized in that the compound planetary friction drive further comprises a motor or generator and the two separate parts of the first sun wheel are hollow and leave enough space in between to place the motor or generator which is connected to the second sun wheel and to the central annulus.

20. Compound planetary friction drive according to claim 17, characterized in that the two separate parts of the first sun wheel do not extend to the central part and that the second sun wheel is solid.

* * * * *